United States Patent
Bani Hani et al.

(10) Patent No.: US 9,507,010 B2
(45) Date of Patent: Nov. 29, 2016

(54) METHOD FOR IMPROVING CLOCK ACCURACY IN A WIDE AREA POSITIONING PSEUDOLITE RECEIVER SYSTEM ARCHITECTURE

(71) Applicant: BLACKBERRY LIMITED, Waterloo (CA)

(72) Inventors: Mohammad Shafiq Bani Hani, Niles, IL (US); Bruce Allen Bernhardt, Wauconda, IL (US); Arnold Sheynman, Northbrook, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 350 days.

(21) Appl. No.: 14/136,565

(22) Filed: Dec. 20, 2013

(65) Prior Publication Data

US 2015/0177360 A1    Jun. 25, 2015

(51) Int. Cl.
*G01S 19/23* (2010.01)
*G01S 19/03* (2010.01)
(Continued)

(52) U.S. Cl.
CPC ............... *G01S 5/0263* (2013.01); *G01S 5/02* (2013.01); *G01S 19/235* (2013.01); *G01S 19/11* (2013.01); *G01S 19/48* (2013.01)

(58) Field of Classification Search
CPC ...... G01S 5/02; G01S 5/0257; G01S 5/0263; G01S 19/01; G01S 19/03; G01S 19/10; G01S 19/11; G01S 19/13; G01S 19/23; G01S 19/235; G01S 19/38; G01S 19/39; G01S 19/42; G01S 19/48; G01S 19/20; G01S 19/43; G01S 19/44; G01S 19/24; G01S 19/25; G01S 19/256; G01S 19/40; G01S 19/14; G01S 19/15
USPC ...... 331/1 R, 17, 18, 44, 175, 176; 342/350, 342/352, 357.2, 357.39, 357.4, 357.47, 342/357.48, 357.51, 357.62, 358, 357.63, 342/357.64
See application file for complete search history.

(56) References Cited

U.S. PATENT DOCUMENTS 3,150,372 A    9/1964  Groth, Jr.
4,602,375 A    7/1986  Inukai
(Continued)

FOREIGN PATENT DOCUMENTS

EP    2200384 A1    6/2010
EP    2530488 A1    12/2012
(Continued)

OTHER PUBLICATIONS

Kappi, Jani, et al.; "Pressure Altitude Enhanced AGNSS Hybrid Receiver for a Mobile Terminal"; ION GNSS 18th International Technical Meeting of the Satellite Division; Sep. 13-16, 2005; 8 pages.

(Continued)

*Primary Examiner* — Bernarr Gregory
(74) *Attorney, Agent, or Firm* — Conley Rose, P.C.; J. Robert Brown, Jr.

(57) ABSTRACT

A method, apparatus and computer-readable medium for determining a frequency drift of clock of a mobile communication device is disclosed. A first positioning signal, such as M-LMS signals, is received at a first positioning engine of the mobile communication device controlled by the clock. A second positioning signal, such as GNSS signals, is received at a second positioning engine of the mobile communication device controlled by the clock. A first position is determined from the first positioning signal, and a second position is determined from the second positioning signal. A difference between the first position and the second position is determined, and the frequency drift of the clock is determined from the difference between the first position and the second position. The frequency drift determined may be subsequently applied to the clock, and thus enhance the accuracy of M-LMS positioning when GNSS signals are unreliable.

20 Claims, 8 Drawing Sheets

(51) Int. Cl.
*G01S 5/02* (2010.01)
*G01S 19/00* (2010.01)
*G01S 19/11* (2010.01)
*G01S 19/48* (2010.01)

(56) References Cited

U.S. PATENT DOCUMENTS

| | | | | |
|---|---|---|---|---|
| 5,786,773 | A * | 7/1998 | Murphy | G01S 19/11 342/357.48 |
| 5,931,889 | A * | 8/1999 | Misra | G01S 19/20 342/358 |
| 6,085,090 | A | 7/2000 | Yee et al. | |
| 6,101,178 | A | 8/2000 | Beal | |
| 6,452,541 | B1 * | 9/2002 | Zhao | G01S 19/235 342/357.62 |
| 6,480,787 | B2 * | 11/2002 | Yoshikawa | G01S 19/23 342/357.24 |
| 6,509,870 | B1 | 1/2003 | Matsushita et al. | |
| 6,564,064 | B1 | 5/2003 | Ciganer et al. | |
| 6,597,988 | B1 | 7/2003 | Brodie et al. | |
| 6,657,584 | B2 | 12/2003 | Cavallaro et al. | |
| 6,744,406 | B2 | 6/2004 | Kalafut et al. | |
| 6,771,625 | B1 | 8/2004 | Beal | |
| 6,879,913 | B1 | 4/2005 | Yu | |
| 6,882,314 | B2 | 4/2005 | Zimmerman et al. | |
| 7,012,563 | B1 * | 3/2006 | Bustamante | G01S 19/235 342/357.62 |
| 7,023,381 | B2 | 4/2006 | Zimmerman et al. | |
| 7,024,215 | B2 | 4/2006 | Krasner | |
| 7,321,776 | B2 * | 1/2008 | Camp, Jr. | G01S 19/256 342/357.64 |
| 7,590,210 | B2 | 9/2009 | Aweya et al. | |
| 7,616,682 | B2 | 11/2009 | Small | |
| 7,663,546 | B1 | 2/2010 | Miyamoto et al. | |
| 7,679,554 | B1 * | 3/2010 | Hwang | G01S 19/15 342/357.24 |
| 7,706,754 | B2 | 4/2010 | Krasner | |
| 7,904,110 | B2 | 3/2011 | Young et al. | |
| 8,106,821 | B2 | 1/2012 | Farmer et al. | |
| 8,373,515 | B2 | 2/2013 | Anandakumar et al. | |
| 8,378,921 | B2 | 2/2013 | Delfeld et al. | |
| 8,421,672 | B2 * | 4/2013 | Jeong | G01S 19/40 342/357.4 |
| 8,466,835 | B2 * | 6/2013 | Elwell, Jr. | G01S 19/235 342/357.62 |
| 9,182,497 | B2 * | 11/2015 | Geier | G01S 19/44 |
| 2002/0025791 | A1 | 2/2002 | Englert et al. | |
| 2003/0058163 | A1 | 3/2003 | Zimmerman et al. | |
| 2004/0021603 | A1 | 2/2004 | Zimmerman et al. | |
| 2004/0027277 | A1 | 2/2004 | Diggelen et al. | |
| 2004/0054470 | A1 | 3/2004 | Farine et al. | |
| 2004/0176102 | A1 | 9/2004 | Lawrence et al. | |
| 2005/0015198 | A1 | 1/2005 | Kee et al. | |
| 2006/0061691 | A1 | 3/2006 | Rabinowitz et al. | |
| 2010/0277338 | A1 | 11/2010 | Laroche | |
| 2011/0263270 | A1 | 10/2011 | Roy et al. | |
| 2011/0285589 | A1 | 11/2011 | Bull | |
| 2012/0264450 | A1 | 10/2012 | Kangas et al. | |
| 2013/0190009 | A1 | 7/2013 | Johansson et al. | |
| 2014/0292569 | A1 | 10/2014 | Wallace et al. | |
| 2014/0378171 | A1 | 12/2014 | Rudow et al. | |
| 2015/0050907 | A1 | 2/2015 | Rudow et al. | |

FOREIGN PATENT DOCUMENTS

| | | |
|---|---|---|
| JP | 2007121066 A | 5/2007 |
| WO | 2005019855 A2 | 3/2005 |
| WO | 2006015265 A2 | 2/2006 |
| WO | 2009132252 A1 | 10/2009 |
| WO | 2013088924 A1 | 6/2013 |

OTHER PUBLICATIONS

Zhou, Zebo, et al.; "A Low-Cost Integrated Navigation System of Quadrotor Aerial Vehicle: Design, Development and Performance"; Proceedings of the 26th International Technical Meeting of the ION Satellite Division; Sep. 16-20, 2013; 12 pages.
Final Office Action dated Aug. 21, 2015; U.S. Appl. No. 13/921,636, filed Jun. 19, 2013; 23 pages.
Advisory Action dated Oct. 26, 2015; U.S. Appl. No. 13/921,636, filed Jun. 19, 2013; 3 pages.
Office Action dated Sep. 18, 2015; U.S. Appl. No. 14/078,016, filed Nov. 12, 2013; 30 pages.
European Examination Report; Application No. 13172820.6; Aug. 17, 2015; 4 pages.
European Extended Search Report; Application No. 14192212.0; Sep. 7, 2015; 16 pages.
Bani Hani, Mohammad Shafiq, et al.; U.S. Appl. No. 13/921,636, filed Jun. 19, 2013; Title: Architecture and Method to 4G-Mobile Positioning.
Bani Hani, Mohammad Shafiq, et al.; U.S. Appl. No. 14/078,016, filed Nov. 12, 2013; Title: Method and System for Implementing a Dual-Mode Dual-Band GNSS/M-LMS Pseudolites Receiver; 45 pages.
Office Action dated Feb. 3, 2015; U.S. Appl. No. 13/921,636, filed Jun. 19, 2013; 21 pages.
Office Action dated Jan. 27, 2015; U.S. Appl. No. 14/078,016, filed Nov. 12, 2013; 24 pages.
European Extended Search Report; Application No. 13172820.6; Dec. 11, 2013; 4 pages.
Mike Seguin, "A Simple GPS Stablized 10 MHz Osacillator," http://www.ko4bb.com/Manuals/05)_GPS_Timing/Simple_10_MHz_GPSDO_-_N1JEZ, May 16, 2004, pp. 1-9.
GPS disciplined oscillator—Wikipedia; htt://en.wikipedia.org/wiki/GPS_disciplined_oscillator, Sep. 9, 2013, 1 sheet.
Jackson Labs Technologies, Inc./ GPSOCXO; http://www.jackson-labs.com/index.php/products/gps_ocxo Sep. 19, 2013, pp. 1-2.
Lombardi, Michael A. "The Use of GPS Disciplined Oscillators as Primary Frequency Standards for Calibration and Metrology Laboratories," Measure, vol. 3 No. 3, Sep. 2008, pp. 56-65.
Lombardi, Michael A. et al.; "Time and Frequency Measurements Using the Global Positioning System," CAL Lab, Jul., Aug., Sep. 2001, pp. 26-33.
VE2ZAZ 10 MHz GPS Disciplined Oscillator; http://pages.cs.wisc.edu/~time/e/gpsdo.html, Sep. 19, 2013, pp. 1-11.
He, Ziming, et al.; "Indoor TDOA Mobile Positioning with Clock Drift and Its Cramer-Rao Bound"; European Wireless Conference; Apr. 16-18, 2013; 6 pages.
Final Office Action dated May 15, 2015; U.S. Appl. No. 14/078,016, filed Nov. 12, 2013; 30 pages.
Advisory Action dated Jul. 21, 2015; U.S. Appl. No. 14/078,016, filed Nov. 12, 2013; 3 pages.
European Extended Search Report; Application No. 14199468.1; May 22, 2015; 11 pages.
Partial European Search Report; Application No. 14192212.0; May 4, 2015; 7 pages.
Office Action dated Dec. 24, 2015; U.S Appl. No. 13/921,636, filed Jun. 19, 2013; 15 pages.
Final Office Action dated Feb. 2, 2016; U.S. Appl. No. 14/078,016, filed Nov. 12, 2013; 24 pages.
Final Office Action dated Mar. 30, 2016; U.S. Appl. No. 13/921,636, filed Jun. 19, 2013; 11 pages.
Advisory Action dated Jun. 2, 2016; U.S. Appl. No. 13/921,636, filed Jun. 19, 2013; 3 pages.
Notice of Allowance dated Jul. 19, 2016; U.S. Appl. No. 13/921,636, filed Jun. 19, 2013; 13 pages.

* cited by examiner

METHOD FOR IMPROVING CLOCK ACCURACY IN A WIDE AREA POSITIONING PSEUDOLITE RECEIVER SYSTEM ARCHITECTURE

FIELD OF THE INVENTION

In general, the present embodiments relate to positioning systems. More particularly, the present embodiments relate to improving the accuracy of positioning systems.

BACKGROUND

Mobile communication devices generally include circuitry for determining a location or position of the device. When the mobile communication device is outside in open sky conditions, position may be determined using GNSS (Global Navigation Satellite System) signals received from GNSS satellites. When the mobile communication device is inside, the GNSS signal is generally too weak to be used effectively. As an alternative, the mobile device may determine an indoor position using a signal obtained from a terrestrial-based positioning system such as terrestrial-based pseudo-satellites (or "pseudolites"). Pseudolites transmit positioning signals using the Multilateration Location and Monitoring Service (M-LMS) frequency band, which ranges from about 902 Megahertz (MHz) to about 928 MHz. The mobile communication device may therefore include a pseudolites positioning engine for determining position using pseudolite positing signals. The pseudolites positioning engine operates off of a clock of the device. The accuracy of the position obtained using the pseudolites positioning engine depends on the clock bias and/or a frequency drift of the clock and aging characteristics of the reference oscillator or clock.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Multilateration Location and Monitoring Service (M-LMS) Pseudolite receiver performance and position accuracy (as is in Global Positioning Satellite (GPS) receiver systems) may depend strongly on the receiver system clock biases and clock drifts. Using a GPS true position fix to measure an actual frequency of received GPS signals in an open sky condition, one may estimate a receiver clock oscillator frequency offset and actual clock drift. The estimated frequency offset may then be applied to correct for M-LMS Pseudolite receiver position errors when open sky conditions are available to get GPS position fixes, and the position error correction may be translated to a clock drift correction. The correction of the clock drift outdoors may assist in correcting for M-LMS receiver accuracy indoors when GPS signals are too weak to provide a solution and therefore cannot be used to estimate clock errors of the main receiver.

Figure 2:
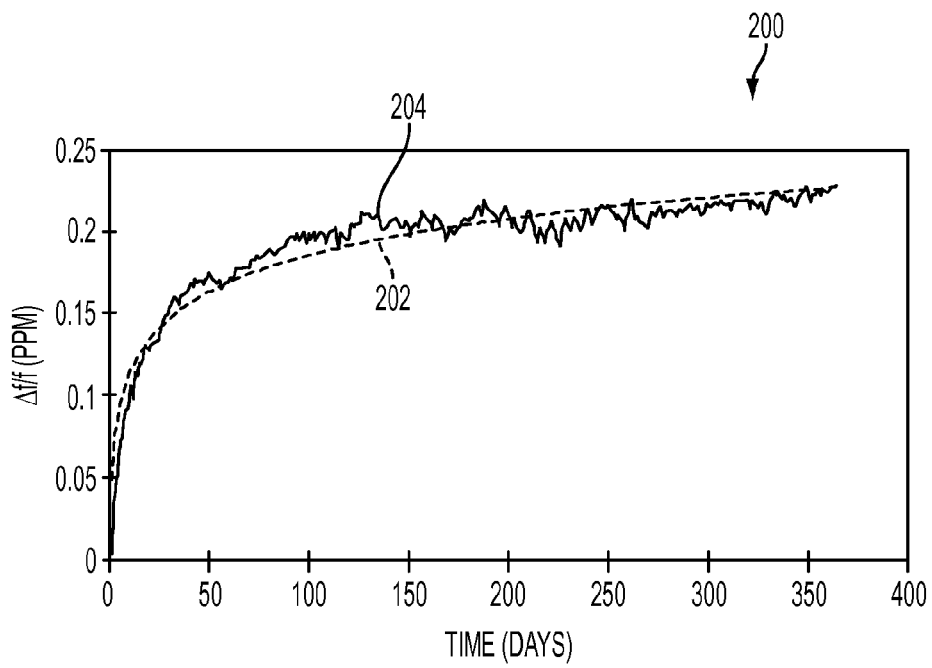
FIG. 2 illustrates a plot of frequency drift for the clock used in the mobile communication device of FIG. 1.

In general, M-LMS Pseudolites (which may be terrestrial-based signal transmitters that mimic GPS signals) may be used for indoor navigation when actual GPS signals are unreliable. However, M-LMS Pseudolite receivers may suffer from drift. For instance, the clock source used in GPS architectures and also envisioned for M-LMS receivers may be based upon temperature compensated crystal oscillators (TCXOs). The TCXO crystal frequency drifts over time in a non-linear fashion (as shown in FIG. 2), which, if not corrected, may directly contribute to position errors in an M-LMS system.

The frequency change/drift versus time curve of the TCXO may be characterized as a polynomial to simplify the estimation of the short term and the long term changes. The output of the polynomial fitting functions may be estimated based upon the total time of crystal use, and may be subject to fitting errors over time. By synchronizing the measured clock offset from the GPS or other GNSS (Global Navigation Satellite System) clock measurement, a correction offset may be added to a polynomial fit equation to improve the overall accuracy over time.

More specifically, one aspect of the present disclosure relates to a computer-implemented method for correcting for the error in the estimation of the clock drift. The method may proceed as follows:

1) When a GNSS fix is obtained with a reported low DOP (Dilution of Precision), typically found in a strong signal environment, such as outdoors in clear sky view conditions, turn on the M-LMS receiver and also obtain a position fix;

2) Calculate the error in distance between the reported GNSS position and the M-LMS receiver's calculated position. If the position error is sufficiently large (e.g., over 10 meters), then proceed to step 3;

3) Calculate the time offset (drift) needed to reduce the position error to zero or as small as possible;

4) Update the polynomial coefficients to correct for the difference in clock drift at the measured time of clock operation; and/or 5) Repeat step numbers 1-4 above when outdoor and build a table of the history log of GNSS/M-LMS clock drift corrections and offsets, and subsequently utilize the clock drift history to determine offset values when in an indoor environment (i.e., leverage learning history of the drift coefficients and offset from previous outdoor corrections).

Figure 1:
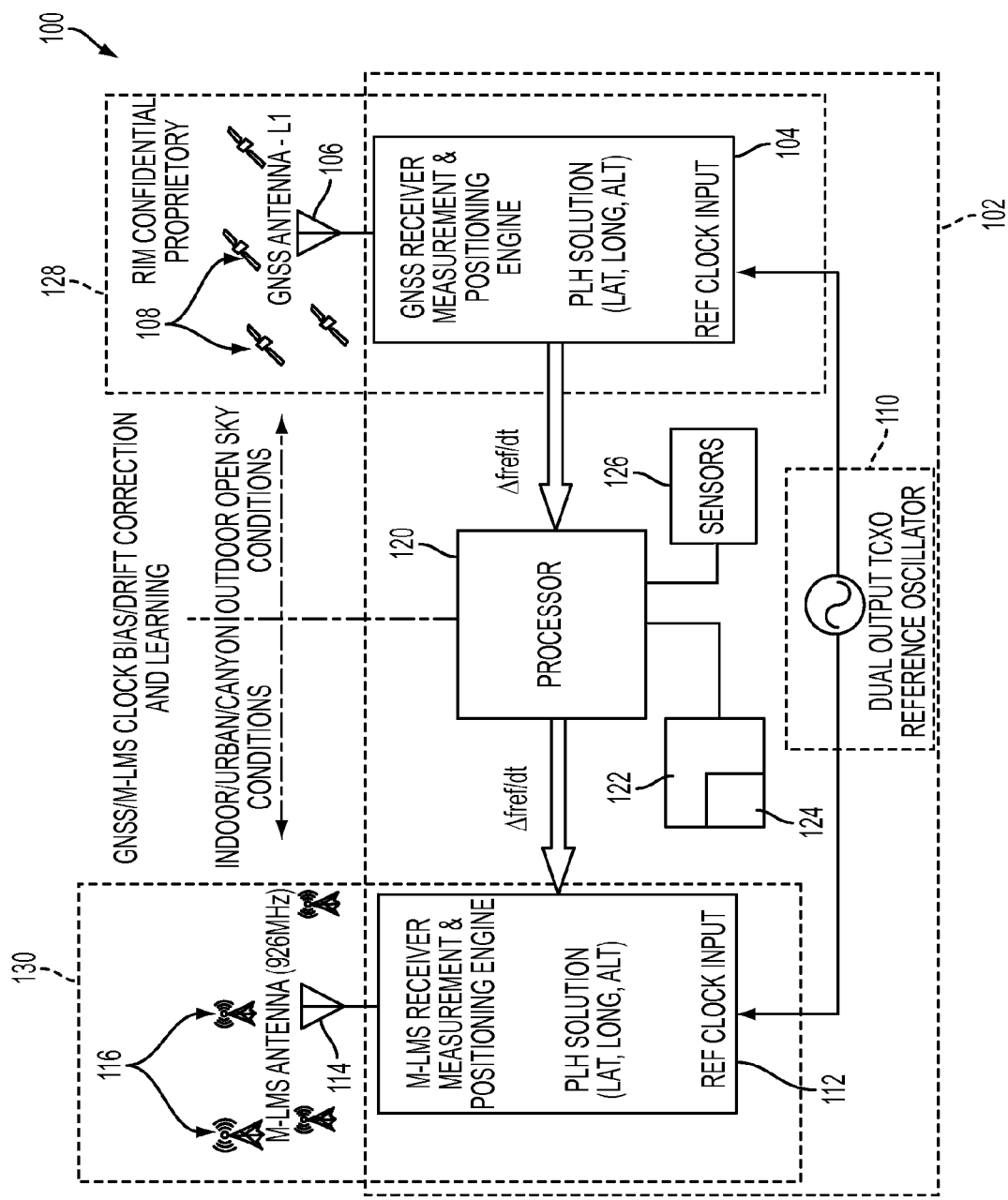
FIG. 1 shows a schematic diagram of an exemplary mobile communication device that includes circuitry for determining a position of a device as well as circuitry to correct to a frequency drift of a clock used in determining the position of the device.

In one aspect, the present embodiments relate to the interaction between GPS and Pseudolite systems/receivers on mobile devices. For instance, a mobile device may have a GPS receiver and a Pseudolite receiver that share a local oscillator (TCXO), such as depicted in FIG. 1. The mobile device may gather GPS signals over time to estimate the TCXO clock drift over time, such as by using polynomial fitting functions. Once the clock drift over time or "true offset" has been calculated/learned using reliable or open sky GPS signals, the true offset or drift may be used by the Pseudolite receiver for indoor navigation when GPS is unreliable.

In one embodiment, a computer-implemented method of local oscillator ("LO") clock correction for a mobile device may be provided. The method may include (1) estimating a true offset of the LO located on the mobile device using GPS signals received via a GPS receiver also located on the mobile device; and (2) applying the estimated true offset of the LO to Pseudolite signals received via a Pseudolite receiver located on the mobile device such that more accurate indoor navigation using the Pseudolite signals is facilitated when GPS signals are unreliable. The method may include additional, fewer, or alternate actions, including those discussed elsewhere herein.

In another embodiment, a method of indoor navigation may be provided. The method may include applying a local oscillator true offset that is estimated using reliable GPS signals to Pseudolite signals that are received when GPS signals are deemed unreliable to facilitate more accurate indoor navigation. The local oscillator true offset may be estimated using the reliable GPS signals and a polynomial fit equation. The method may include additional, fewer, or alternate actions, including those discussed elsewhere herein.

In another embodiment, a mobile device configured for outdoor and indoor positioning/navigation may be provided. The mobile device may have a shared local oscillator (LO) that is used for both a GPS receiver and a Pseudolite receiver. The mobile device may be configured to apply a LO true offset determined from GPS signals previously received by the GPS receiver to Pseudolite signals received by the Pseudolite receiver to facilitate enhanced indoor navigation and compensate for LO drift. The mobile device may include additional, fewer, or alternate components, including those discussed elsewhere herein.

I. Exemplary Mobile Communication Device

FIG. 1 shows a schematic diagram 100 of an exemplary mobile communication device 102 that includes circuitry for determining a position of a device 102 as well as circuitry to correct to a frequency drift of a dock used in determining the position of the device 102. The device 102 operates using both a Global Navigation Satellite System (GNSS) 128 and a Multilateration Location and Monitoring Service (M-LMS) positioning system, which is also referred to herein as a pseudolite system 130. The GNSS system 128 generally includes various satellites 108 and a GNSS positioning engine 104 and a GNSS antenna 106 for receiving the GNSS positioning signals from the various satellites. The device 102 includes the GNSS positioning engine 104 and its GNSS antenna 106. The GNSS positioning engine 104 receives GNSS signals provided by satellites 108 and determines a position of the device 102 using the received GNSS signals. The GNSS positioning engine 104 operates off of a dock 110. In various embodiments, clock 110 may be a temperature-controlled crystal oscillator (TCXO). The accuracy of the position determined using the GNSS system 128 is dependent to some extent on a frequency of the dock, which is known to drift over time.

The pseudolites system 130 includes various pseudolite transmitters ("pseudolites" 116), a Multilateration Location Monitoring Service (M-LMS) positioning engine ("pseudolites positioning engine" 112) and an M-LMS antenna 114. The device 102 includes the pseudolites positioning engine 112 and its M-LMS antenna 114. The pseudolites positioning engine 112 receives an M-LMS signal from pseudolites 116. The pseudolites 116 are terrestrial-based transmitters that transmit navigational signals similar to GNSS signals. Pseudolites 116 generally transmit in the M-LMS frequency band, which ranges from about 902 Megahertz (MHz) to about 928 MHz. The M-LMS measurement and positioning engine 112 also operates off of the clock 110.

In various embodiments, the device 102 is able to decide which positioning system to use: the GNSS system 128 or the pseudolites system 130. In general, the GNSS system 128 will provide a more accurate position of the device 102 than the pseudolites system 130. Thus, when the device 102 is outdoors and/or is able to obtain a suitable signal from the GNSS satellites 108, the device 102 will select to use the GNSS system 128 to determine its position. However, when the device 102 is indoors or is otherwise in a location at which the GNSS signals are weak or unavailable such as a urban surroundings, canyons or surrounded by tall buildings, etc., the device 102 will select to use the terrestrial pseudolites system 130 to determine its position.

The device 102 further includes one or more environmental detection sensors 126 that may provide environmental parameter measurements that may be used to determine which positioning system to use. In various embodiments, the one or more environmental sensors 126 may provide measurements which are indicative of the environment within which the device 102 is operating, i.e., whether the device 102 is indoors or outdoors. Such environmental sensors 126 may include, for example, light detectors, temperature detectors, pressure detectors, signal strength detectors, imagers, etc.

FIG. 1 further shows a processor 120 that may be used in part to correct an error in position resulting from the effects of a frequency drift of the clock 110. The processor 120 is in communication with a memory storage device 122 that may be used to store data suitable for correcting the error in position. Such data may include, but is not limited to, a history of clock frequencies and frequency drift at various recorded times, curve fit parameters for a polynomial curve fit to the recorded clock drift, one or more calculated frequency drifts related to difference in positions obtained using the GNSS system 128 and the pseudolites system 130, etc. The processor 120 may further have access to programs 124 stored in the memory storage device 122 which may enable the processor 120 to perform methods for correcting position measurements and for providing a correction for frequency drift of the clock 110.

The processor 120 may further process environmental parameter measurements from the environmental sensors 126 and use the environmental parameter measurements to select which positioning system to use. If either or both positioning pseudolites signals and GNSS signals are of suitable signal strength, the processor 120 may select to perform a method of correcting for frequency drift of clock 110 using the methods disclosed herein.

II. Exemplary Clock Drift

FIG. 2 illustrates a plot 202 of frequency drift for clock 110 used in the mobile communication device 102. Time is shown in days along the x-axis. Frequency drift ($\Delta f/f$) is shown along the y-axis in parts per million (ppm). The frequency of the clock 110 drifts over time in a non-linear fashion, recording a relatively large frequency drift over the 100 days or so and recording a relatively small frequency drift after the first 100 days. The frequency drift may contribute to position errors when determining a position using at least the pseudolites system 130. Curve 202 represents a predicted frequency drift of the clock 110. Curve 204 shows an actual frequency drift of the clock 110 obtain from experimental measurements.

III. Exemplary Polynomial Fits

Figure 3:
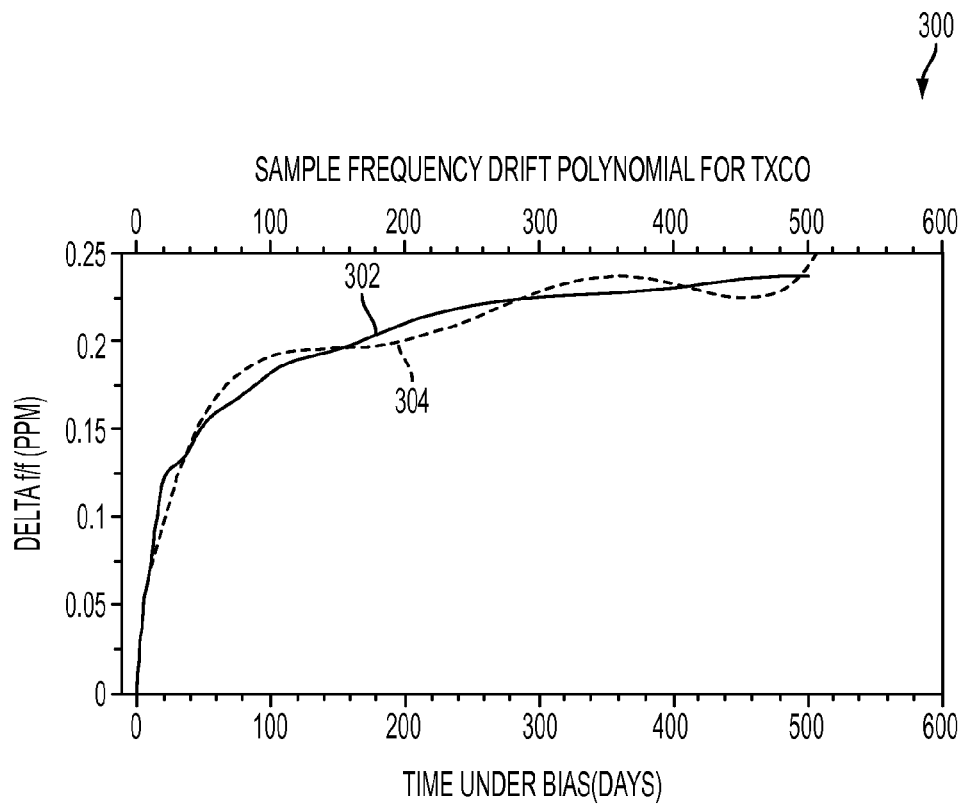
FIG. 3 illustrates a polynomial curve fit to a frequency drift response curve of the clock.

FIG. 3 illustrates a polynomial curve fit to a frequency drift response curve of clock 110. Time is shown in days along the x-axis. Frequency drift ($\Delta f/f$) is shown along the y-axis in ppm. Curve 302 shows measured frequency drift data of the clock 110 over time. Polynomial curve 304 shows the polynomial fit to the measured frequency drift data of curve 302. The exemplary polynomial curve 304 corresponds to a fifth-order polynomial. The general form for a fifth-order polynomial equation is:

$$\Delta f/f = a_0 + a_1 t + a_2 t^2 + a_3 t^3 + a_4 t^4 + a_5 t^5 \quad \text{Eq. (1)}$$

Fitting parameters ($a_0$, $a_1$, $a_2$, $a_3$, $a_4$, $a_5$) may be determined using any suitable method, such as least-squares fitting, regression analysis, etc. For the exemplary curve 304 of FIG. 3, the values of the fitting parameters are
$a_0 = 3.0180466545697 \times 10^{-2}$
$a_1 = 4.0473019552178 \times 10^{-3}$
$a_2 = -3.7756209773199 \times 10^{-5}$
$a_3 = 1.6417510287428 \times 10^{-7}$
$a_4 = -3.2359371990001 \times 10^{-11}$
$a_5 = 2.3452030343328 \times 10^{-13}$
with a goodness of fit of
$R^2 = 0.970855103561$ A frequency drift for correcting position measurements at a selected time may be selected from the polynomial curve 304. In general, it is desired to know the frequency drift of the clock to within less than +/−0.5 ppm in order to determine the position of the device 102 within a suitable degree of accuracy. However, the polynomial curve 304 may not provide such accuracy with respect to frequency drift. The present disclosure therefore provides a method for correcting, altering or updating the polynomial curve 304 and its fitting parameters using substantially simultaneous positions measurements obtained the GNSS system 128 and the pseudolites system 130.

While the disclosure is discussed with respect to using a fifth-order polynomial, it is understood that any suitable order of polynomial may be used in other embodiments.

Figure 4:
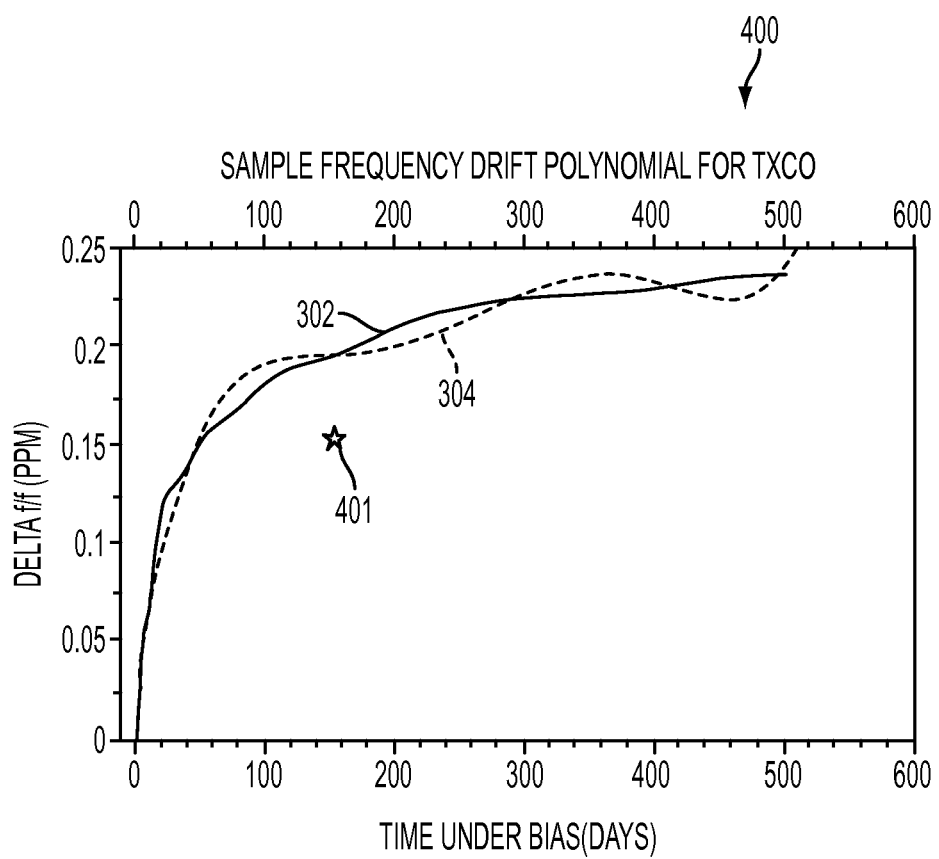
FIG. 4 shows the curves of FIG. 3 with an additional frequency drift data point obtained using a pseudolites positioning system and the GNSS positioning system.

FIG. 4 shows the curves of FIG. 3 with an additional frequency drift data point 401 obtained using the pseudolites system 130 and the GNSS system 128. The frequency drift data point 401 may be obtained by determining a first position using the pseudolites system 130 and determining a second position using the GNSS system 128, determining a difference between the first position and the second position and calculating a frequency drift for which the difference in the position is reduced to a within a suitable criterion or to a minimum amount, such as zero. The exemplary frequency drift data point 401 shows that at 150 days, a frequency drift that suitably reduces the difference in position is about 0.15 ppm. From the polynomial curve, the estimated frequency drift correction for the clock 110 at 150 day of operation is about 0.18 ppm. The difference between the calculated frequency drift 401 and the frequency drift obtained from the polynomial curve 304 is therefore about 0.03 ppm.

In order to obtain a curve that provides frequency drift values that more suitably reduce a difference in positions, the fifth order polynomial is re-fit or updated to the experimental data measurements (curve 302) with the addition of the calculated frequency drift (data point 401). The updated polynomial curve may then be used to provide a selected frequency drift for use in subsequent pseudolites position calculations and other operations. The updated polynomial curve may be used until a time at which a new correction is performed. In an exemplary embodiment, the new correction also determines difference in positions obtained between the GNSS system 128 and the pseudolites system 130. In the new correction, both the newly determined frequency drift (from the difference in position measurements) and any previously determined frequency drifts may be used to alter the polynomial curve and its fitting parameters. Calculated frequency drifts may be stored in a history log. The stored history log of frequency drifts may then be retrieved and used for subsequent updates to the polynomial curve.

IV. Exemplary Method

Figure 5:
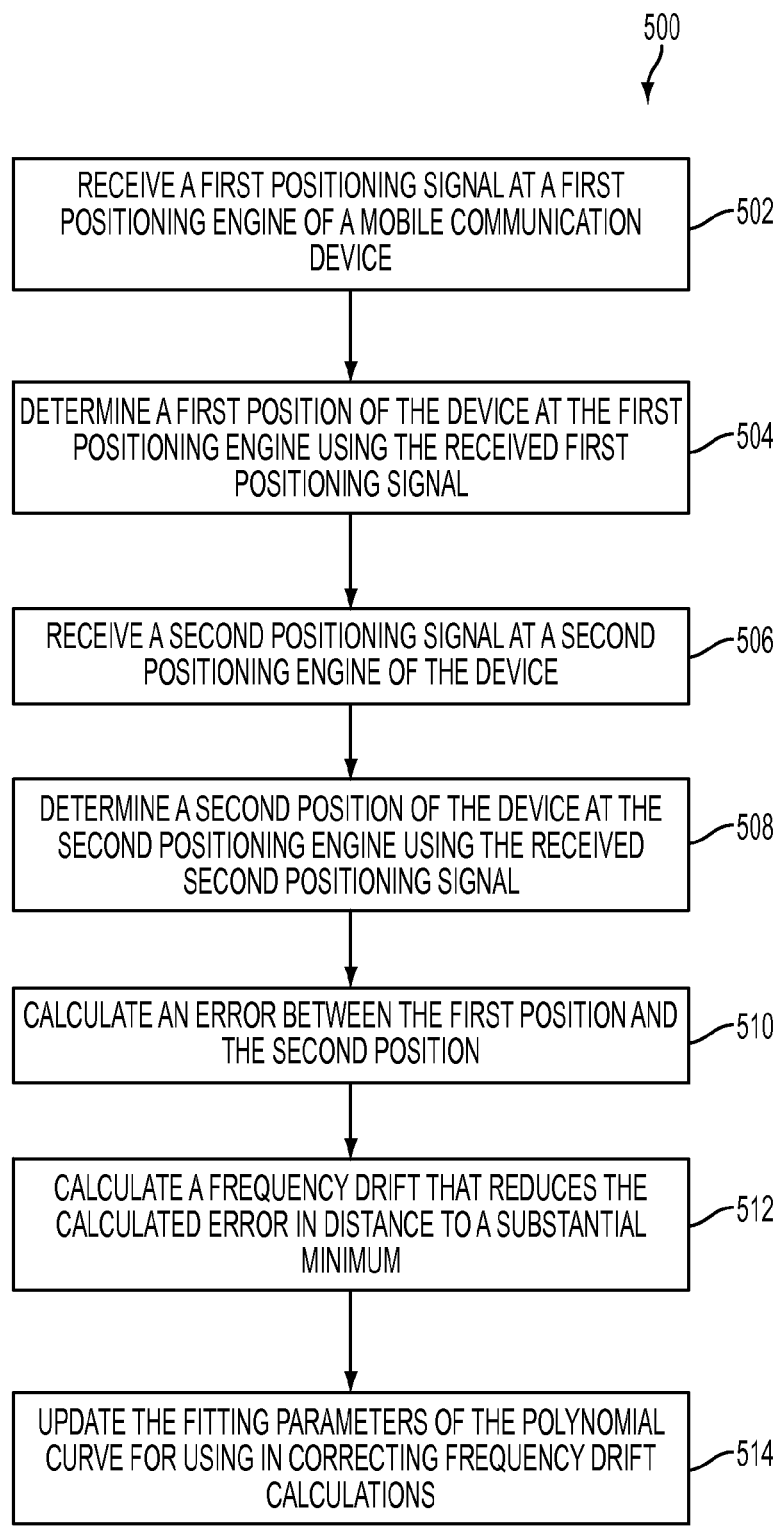
FIG. 5 shows a flowchart illustrating an exemplary method for correcting the error provided by frequency drift in a clock.

FIG. 5 shows a flowchart 500 illustrating an exemplary method for correcting the error provided by frequency drift in clock 110. In block 502, a first positioning signal is received at a first positioning engine of the mobile communication device 102. In one embodiment, the first positioning signal may be terrestrial-based positioning signal such as an M-LMS pseudolites signal and the first positioning engine may be an engine of the device 102 such as pseudolites positioning engine 112 that determines position based on the terrestrial-based positioning signal. In block 504, the first positioning engine of the mobile communication device 102 determines a first position of the mobile communication device 102 using the received first positioning signal.

In block 506, a second positioning signal is received at a second positioning engine of the mobile communication device 102. In one embodiment, the second positioning signal may be a satellite-based positioning signal such as a Global Navigation Satellite System positioning signal and the second positioning engine may be a GNSS positioning engine 104. In block 508, the second positioning engine determines a second position of the mobile communication device 102 using the received second positioning signal. The second positioning engine is operated based on the same clock 110 that operations the first positioning engine.

In block 510, a difference is calculated between the first position and the second position. In general, frequency drift of clock 110 affects both the GNSS-determined position as well as the pseudolites-determined position. However, accurate clock offsets may be measured using the GNSS receiver when the receiver is locked to the satellites. Thus, the GNSS-determined position may be used a standard position measurement that calibrates the pseudolites-determined position measurement. In block 512, a frequency drift value is calculated that reduces or minimizes the difference between the first position and the second position. In block 514, the calculated frequency drift value is used to update or alter fitting parameters of the polynomial curve so that the updated polynomial curve that results from the updated fitting parameters may be used to correct subsequent position measurements obtained using the pseudolites system 130. The exemplary method may include additional, fewer, or alternate actions, including those discussed elsewhere herein.

V. Exemplary Learning System

Figure 6:
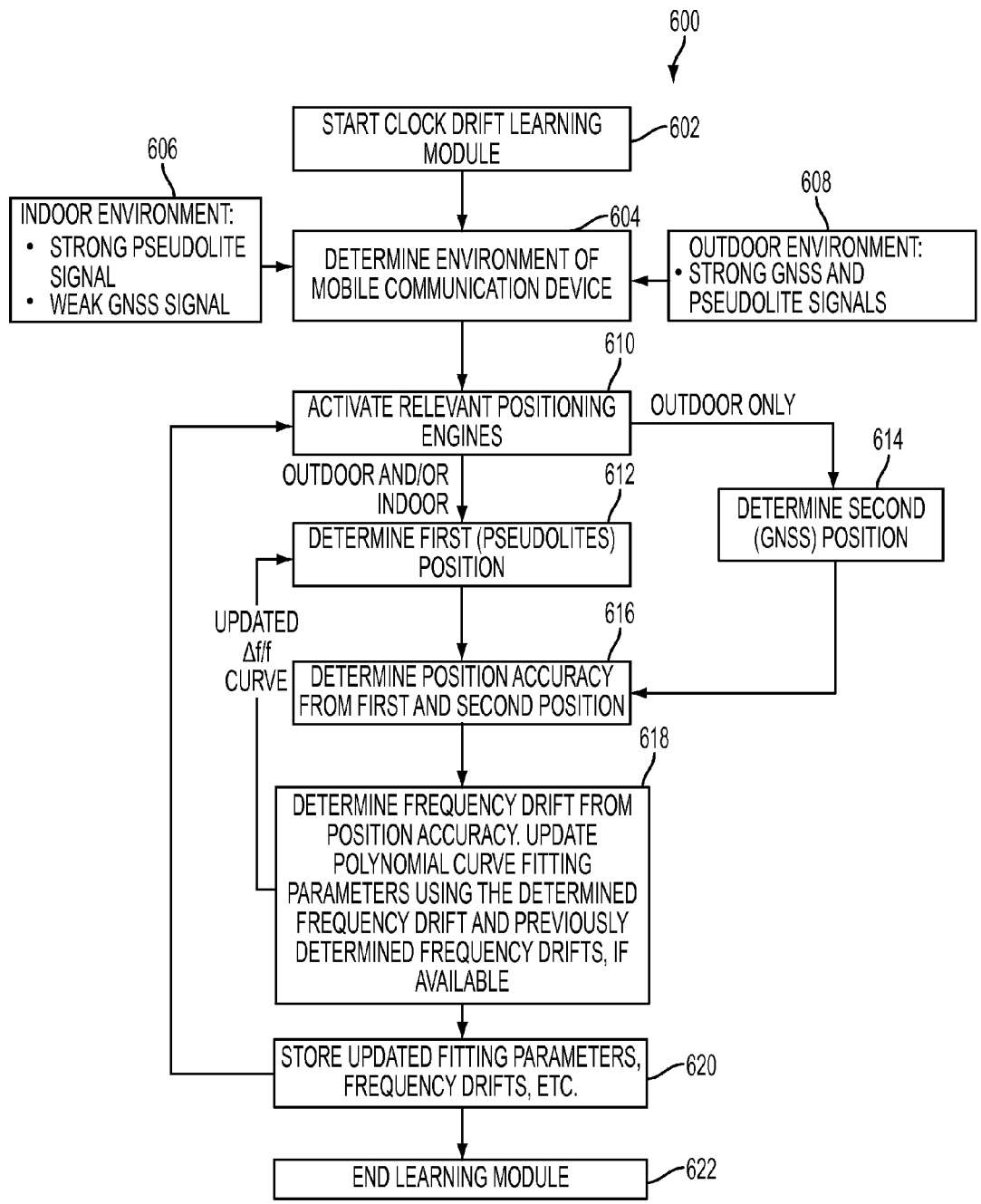
FIG. 6 shows a flowchart illustrating a learning system that may be used to improve position measurements using multiple position-related frequency drift calibrations.

FIG. 6 shows a flowchart illustrating a learning system that may be used to improve position measurements using multiple position-related frequency drift calibrations. In block 602, a learning module is initiated. The learning module initializes and configures data to the system, GNSS positioning engine 104, pseudolites positioning engine 112, processor 102, etc. An environmental detection routine is also initiated which prepares the environmental sensors 126 for obtaining environmental parameters measurements.

In block 604, environmental parameter measurements are obtained from the environmental detection sensors 126. In one case (block 606), the environmental measurements may indicate an indoor environment. Such measurements may include strong pseudolite signals and weak GNSS signals. In another case (block 608), the environmental measurements may indicate an outdoor open sky environment. Such measurements may include strong pseudolite signals, strong open sky GNSS signals, expected outdoor light conditions, temperature and pressure, etc.

In block 610, processor 120 receives the measurements from the environmental sensors 126 and determines whether the device 102 is in an indoor or an outdoor environment. Depending on the determined environment, the processor may activate and configure the GNNS positioning engine 104, the pseudolites positioning engine 112, or both.

In block 612, a first position is obtained using the pseudolite positioning engine 112. Block 612 may generally be performed whether the device 102 is either indoors or outdoors. In block 614, a second position is obtained using the GNSS positioning engine 104. Block 614 may generally be performed only when the device 102 is outdoors, or in other words, when the device 102 is receiving a strong GNSS signal from satellites 108.

In block 616, a difference between the first position and the second position is determined. The determined difference in position is converted into a calculated frequency drift of clock 110. In block 618, the calculated frequency drift and the experimentally-determined frequency offset data are used to calculate an updated set of fitting parameters ($a_0$, $a_1$, $a_2$, $a_3$, $a_4$, $a_5$) to obtain an updated polynomial curve. Any previously determined frequency drifts obtained from differences position measurements may be stored in a history log. These frequency drifts may be retrieved from the history log at a later calibration time and used to update the polynomial curve at that time. Additionally, blocks 612, 616 and 618 form a closed loop in which the updated fitting parameters for the updated polynomial curve are sent back to block 612 and used to determine a third position based on the pseudolites system (similar to determining the first position). By obtaining a fourth position (e.g. a second GNNS position) a second difference in position may be then determined when using a frequency selected from the updated polynomial curve and a second frequency drift may then be calculated from the second difference in position. The second frequency drift may then be used to further update the polynomial curve. This loop may be continued for a selected number of iterations or until an accuracy of the pseudolites position and/or of the frequency drift is within a selected criterion.

In block 620, the calculated frequency data, updated fitting parameters and other suitable data are stored in the storage memory location. A calibration history may be stored in a suitable database for use in future calibrations. The process may either then return to block 610 to continue obtaining data from the positioning engines or proceed to block 622. In block 622, the learning module is ended. The exemplary learning system may include additional, less, or alternate components and/or functionality, including the functionality discussed elsewhere herein.

VI. Exemplary System

Figure 7:
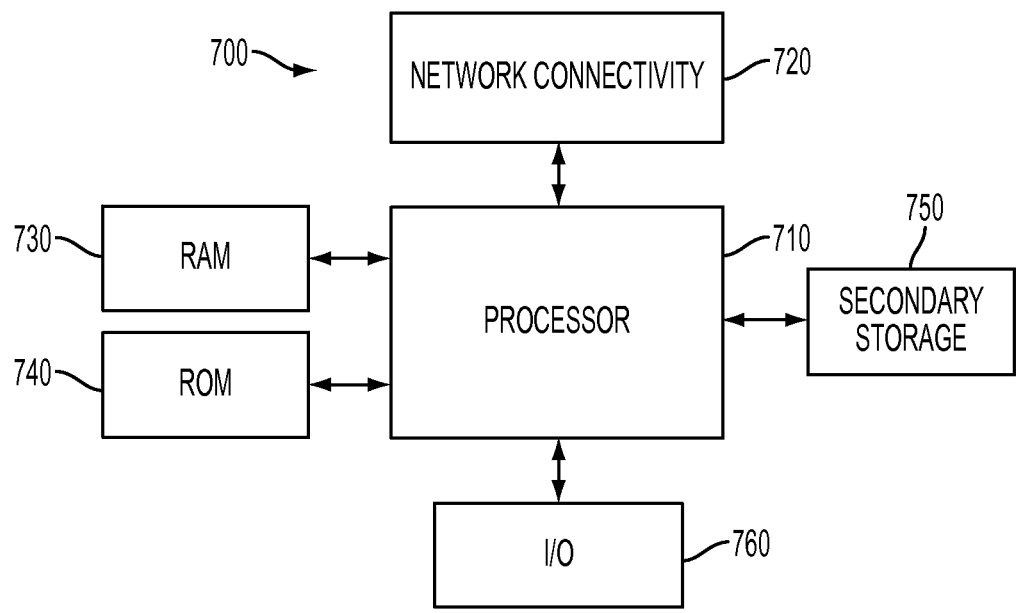
FIG. 7 illustrates an example of a system suitable for implementing one or more embodiments disclosed herein.

FIG. 7 illustrates an example of a system 700 suitable for implementing one or more embodiments disclosed herein. In various embodiments, the system 700 comprises a processor 710, which may be referred to as a central processor unit (CPU) or digital signal processor (DSP), or Application Processor (AP), network connectivity interfaces 720, random access memory (RAM) 730, read only memory (ROM) 740, secondary storage 750, and input/output (I/O) devices 760. In some embodiments, some of these components may not be present or may be combined in various combinations with one another or with other components not shown. These components may be located in a single physical entity or in more than one physical entity. Any actions described herein as being taken by the processor 710 might be taken by the processor 710 alone or by the processor 710 in conjunction with one or more components shown or not shown in FIG. 7.

The processor 710 executes instructions, codes, computer programs, or scripts that it might access from the network connectivity interfaces 720, RAM 730, or ROM 740. While only one processor 710 is shown, multiple processors may be present. Thus, while instructions may be discussed as being executed by a processor 710, the instructions may be executed simultaneously, serially, or otherwise by one or multiple processors 710 implemented as one or more CPU chips.

In various embodiments, the network connectivity interfaces 720 may take the form of modems, modem banks, Ethernet devices, universal serial bus (USB) interface devices, serial interfaces, token ring devices, fiber distributed data interface (FDDI) devices, wireless local area network (WLAN) devices (including radio, optical or infrared signals), radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 720 may enable the processor 710 to communicate with the Internet or one or more telecommunications networks or other networks from which the processor 710 might receive information or to which the processor 710 might output information.

The network connectivity interfaces 720 may also be capable of transmitting or receiving data wirelessly in the form of electromagnetic waves, such as radio frequency signals or microwave frequency signals. Information transmitted or received by the network connectivity interfaces 720 may include data that has been processed by the processor 710 or instructions that are to be executed by processor 710. The data may be ordered according to different sequences as may be desirable for either processing or generating the data or transmitting or receiving the data.

In various embodiments, the RAM 730 may be used to store volatile data and instructions that are executed by the processor 710. The ROM 740 shown in FIG. 7 may likewise be used to store instructions and data that is read during execution of the instructions. The secondary storage 750 is typically comprised of one or more disk drives, solid state drives, or tape drives and may be used for non-volatile storage of data or as an overflow data storage device if RAM 730 is not large enough to hold all working data. Secondary storage 750 may likewise be used to store programs that are loaded into RAM 730 when such programs are selected for execution. The I/O devices 760 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, track pads, voice recognizers, card readers, paper tape readers, printers, video monitors, or other well-known input/output devices.

VII. Exemplary Wireless Communication Environment

Figure 8:
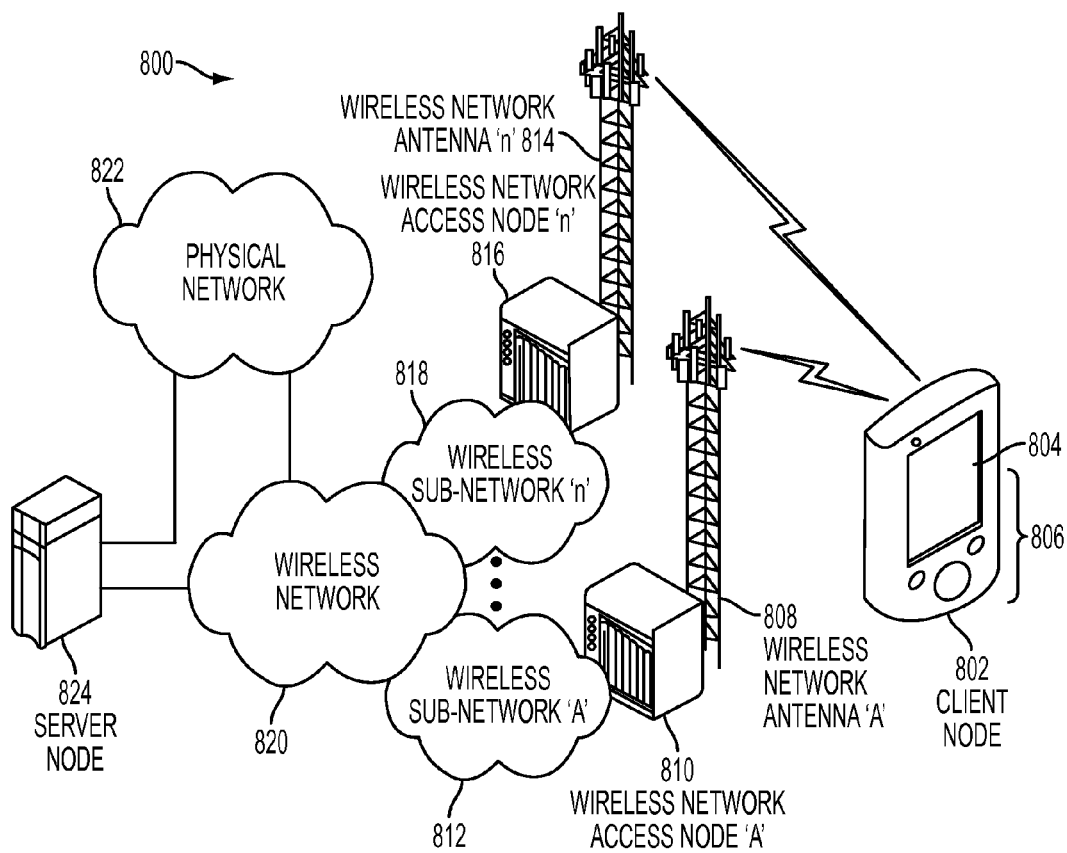
FIG. 8 shows a wireless-enabled communications environment including an embodiment of a client node as implemented in an embodiment of the disclosure.

FIG. 8 shows a wireless-enabled communications environment including an embodiment of a client node as implemented in an embodiment of the disclosure. Though illustrated as a mobile phone, the client node 802 may take various forms including a wireless handset, a pager, a smart phone, or a personal digital assistant (PDA), a smart watch, a user equipment (UE), or other wireless communication device, including those discussed below. In various embodiments, the client node 802 may also comprise a portable computer, a tablet computer, a laptop computer, or any computing device operable to perform data communication operations. Many suitable devices combine some or all of these functions. In some embodiments, the client node 802 is not a general purpose computing device like a portable, laptop, or tablet computer, but rather is a special-purpose communications device such as a telecommunications device installed in a vehicle. The client node 802 may likewise be a device, include a device, or be included in a device that has similar capabilities but that is not transportable, such as a desktop computer, a set-top box, or a network node. In these and other embodiments, the client node 802 may support specialized activities such as gaming, inventory control, job control, task management functions, and so forth.

In various embodiments, the client node 802 includes a display 804. In these and other embodiments, the client node 802 may likewise include a touch-sensitive surface, a keyboard or other input keys 806 generally used for input by a user. The input keys 806 may likewise be a full or reduced alphanumeric keyboard such as QWERTY, DVORAK, AZERTY, and sequential keyboard types, or a traditional numeric keypad with alphabet letters associated with a telephone keypad. The input keys 806 may likewise include a trackwheel, an exit or escape key, a trackball, and other navigational or functional keys, which may be moved to different positions, e.g., inwardly depressed, to provide further input function. The client node 802 may likewise present options for the user to select, controls for the user to actuate, and cursors or other indicators for the user to direct.

The client node 802 may further accept data entry from the user, including numbers to dial or various parameter values for configuring the operation of the client node 802. The client node 802 may further execute one or more software or firmware applications in response to user commands. These applications may configure the client node 802 to perform various customized functions in response to user interaction. Additionally, the client node 802 may be programmed or configured over-the-air (OTA), for example from a wireless network access node 'A' 810 through 'n' 816 (e.g., a base station), a server node 824 (e.g., a host computer), or a peer client node 802.

Among the various applications executable by the client node 802 are a web browser, which enables the display 804 to display a web page. The web page may be obtained from a server node 824 through a wireless connection with a wireless network 820. As used herein, a wireless network 820 broadly refers to any network using at least one wireless connection between two of its nodes. The various applications may likewise be obtained from a peer client node 802 or other system over a connection to the wireless network 820 or any other wirelessly-enabled communication network or system.

In various embodiments, the wireless network 820 comprises a plurality of wireless sub-networks (e.g., cells with corresponding coverage areas) 'A' 812 through 'n' 818. As used herein, the wireless sub-networks 'A' 812 through 'n' 818 may variously comprise a mobile wireless access network or a fixed wireless access network. In these and other embodiments, the client node 802 transmits and receives communication signals, which are respectively communicated to and from the wireless network nodes 'A' 810 through 'n' 816 by wireless network antennas 'A' 808 through 'n' 814 (e.g., cell towers). In turn, the communication signals are used by the wireless network access nodes 'A' 810 through 'n' 816 to establish a wireless communication session with the client node 802. As used herein, the network access nodes 'A' 810 through 'n' 816 broadly refer to any access node of a wireless network. As shown in FIG. 8, the wireless network access nodes 'A' 810 through 'n' 816 are respectively coupled to wireless sub-networks 'A' 812 through 'n' 818, which are in turn connected to the wireless network 820.

In various embodiments, the wireless network 820 is coupled to a core network 822, e.g., a global computer network such as the Internet. Via the wireless network 820 and the core network 822, the client node 802 has access to information on various hosts, such as the server node 824. In these and other embodiments, the server node 824 may provide content that may be shown on the display 804 or used by the client node processor 710 for its operations. Alternatively, the client node 802 may access the wireless network 820 through a peer client node 802 acting as an intermediary, in a relay type or hop type of connection. As another alternative, the client node 802 may be tethered and obtain its data from a linked device that is connected to the wireless sub-network 812. Skilled practitioners of the art will recognize that many such embodiments are possible and the foregoing is not intended to limit the spirit, scope, or intention of the disclosure.

VIII. Exemplary Client Node

Figure 9:
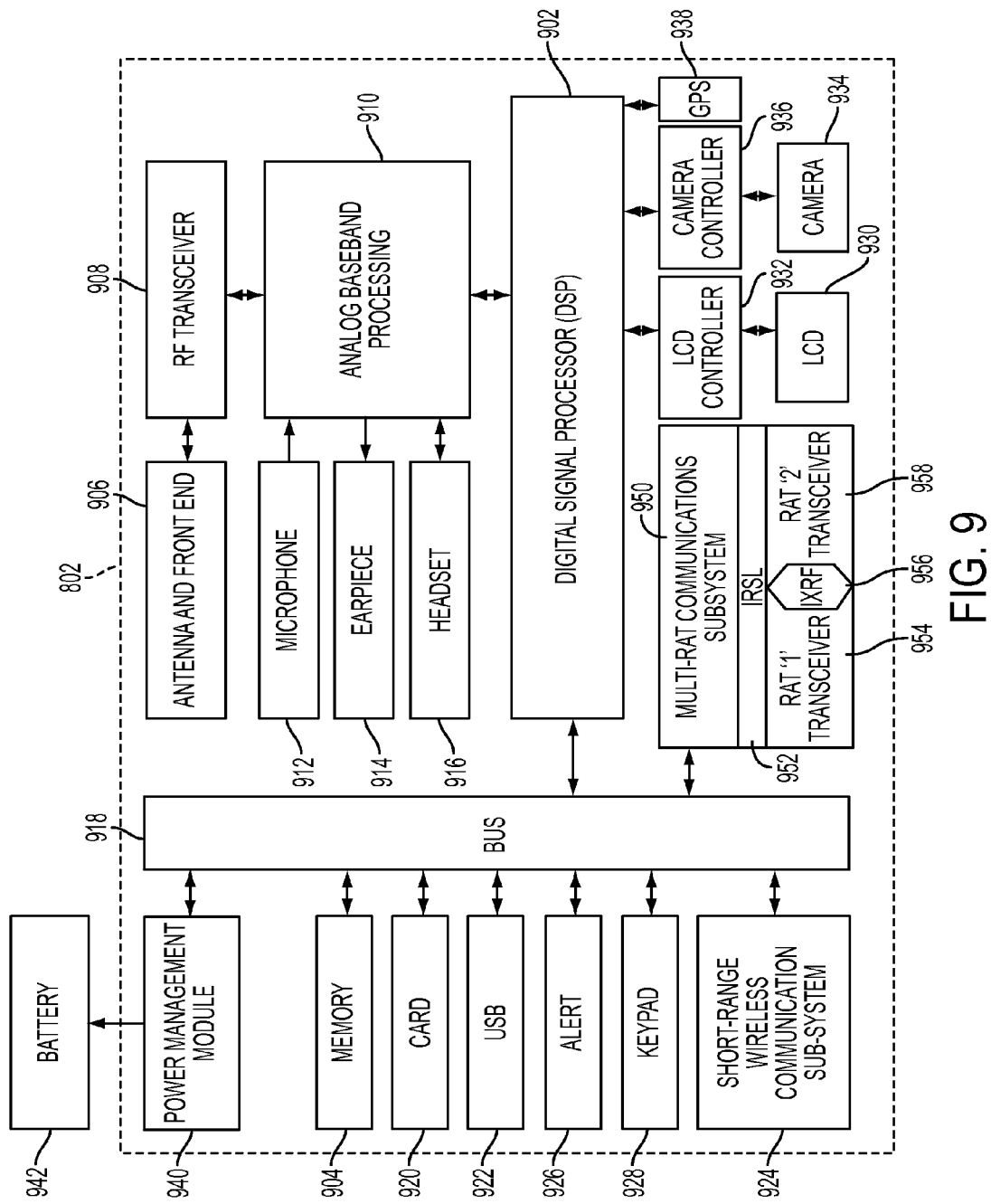
FIG. 9 depicts a block diagram of an exemplary client node as implemented with a digital signal processor (DSP) in accordance with an embodiment of the disclosure.

FIG. 9 depicts a block diagram of an exemplary client node as implemented with a digital signal processor (DSP) in accordance with an embodiment of the disclosure. While various components of a client node 802 are depicted, various embodiments of the client node 802 may include a subset of the listed components or additional components not listed. As shown in FIG. 9, the client node 802 includes a DSP 902 and a memory 904. As shown, the client node 802 may further include an antenna and front end unit 906, a radio frequency (RF) transceiver 908, an analog baseband processing unit 910, a microphone 912, an earpiece speaker 914, a headset port 916, a bus 918, such as a system bus or an input/output (I/O) interface bus, a removable memory card 920, a universal serial bus (USB) port 922, a short range wireless communication sub-system 924, an alert 926, a keypad 928, a liquid crystal display (LCD) 930, which may include a touch sensitive surface, an LCD controller 932, a charge-coupled device (CCD) camera 934, a camera controller 936, and a global positioning system (GPS) sensor 938, and a power management module 940 operably coupled to a power storage unit, such as a battery 942. In various embodiments, the client node 802 may include another kind of display that does not provide a touch sensitive screen. In one embodiment, the DSP 902 communicates directly with the memory 904 without passing through the input/output interface ("Bus") 918.

In various embodiments, the DSP 902 or some other form of controller or central processing unit (CPU) operates to control the various components of the client node 802 in accordance with embedded software or firmware stored in memory 904 or stored in memory contained within the DSP 902 itself. In addition to the embedded software or firmware, the DSP 902 may execute other applications stored in the memory 904 or made available via information media such as portable data storage media like the removable memory card 920 or via wired or wireless network communications. The application software may comprise a compiled set of machine-readable instructions that configure the DSP 902 to provide the desired functionality, or the application software may be high-level software instructions to be processed by an interpreter or compiler to indirectly configure the DSP 902.

The antenna and front end unit 906 may be provided to convert between wireless signals and electrical signals, enabling the client node 802 to send and receive information from a cellular network or some other available wireless communications network or from a peer client node 802. In an embodiment, the antenna and front end unit 906 may include multiple antennas to support beam forming and/or multiple input multiple output (MIMO) operations. As is known to those skilled in the art, MIMO operations may provide spatial diversity, which can be used to overcome difficult channel conditions or to increase channel throughput. Likewise, the antenna and front-end unit 906 may include antenna tuning or impedance matching components, RF power amplifiers, or low noise amplifiers.

In various embodiments, the RF transceiver 908 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 910 or the DSP 902 or other central processing unit. In some embodiments, the RF Transceiver 908, portions of the Antenna and Front End 906, and the analog base band processing unit 910 may be combined in one or more processing units and/or application specific integrated circuits (ASICs).

Note that in this diagram the radio access technology (RAT) RAT1 and RAT2 transceivers 954, 958, the IXRF 956, the IRSL 952 and Multi-RAT subsystem 950 are operably coupled to the RF transceiver 908 and analog baseband processing unit 910 and then also coupled to the antenna and front end 906 via the RF transceiver 908. As there may be multiple RAT transceivers, there will typically be multiple antennas or front ends 906 or RF transceivers 908, one for each RAT or band of operation.

The analog baseband processing unit 910 may provide various analog processing of inputs and outputs for the RF transceivers 908 and the speech interfaces (912, 914, 916). For example, the analog baseband processing unit 910 receives inputs from the microphone 912 and the headset 916 and provides outputs to the earpiece 914 and the headset 916. To that end, the analog baseband processing unit 910 may have ports for connecting to the built-in microphone 912 and the earpiece speaker 914 that enable the client node 802 to be used as a cell phone. The analog baseband processing unit 910 may further include a port for connecting to a headset or other hands-free microphone and speaker configuration. The analog baseband processing unit 910 may provide digital-to-analog conversion in one signal direction and analog-to-digital conversion in the opposing signal direction. In various embodiments, at least some of the functionality of the analog baseband processing unit 910 may be provided by digital processing components, for example by the DSP 902 or by other central processing units.

The DSP 902 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 902 may perform modulation, coding, interleaving, and spreading, and for a receiver function the DSP 902 may perform despreading, deinterleaving, decoding, and demodulation. In another embodiment, for example in an orthogonal frequency division multiplex access (OFDMA) technology application, for the transmitter function the DSP 902 may perform modulation, coding, interleaving, inverse fast Fourier transforming, and cyclic prefix appending, and for a receiver function the DSP 902 may perform cyclic prefix removal, fast Fourier transforming, deinterleaving, decoding, and demodulation. In other wireless technology applications, yet other signal processing functions and combinations of signal processing functions may be performed by the DSP 902.

The DSP 902 may communicate with a wireless network via the analog baseband processing unit 910. In some embodiments, the communication may provide Internet connectivity, enabling a user to gain access to content on the Internet and to send and receive e-mail or text messages. The input/output interface 918 interconnects the DSP 902 and various memories and interfaces. The memory 904 and the removable memory card 920 may provide software and data to configure the operation of the DSP 902. Among the interfaces may be the USB interface 922 and the short range wireless communication sub-system 924. The USB interface 922 may be used to charge the client node 802 and may also enable the client node 802 to function as a peripheral device to exchange information with a personal computer or other computer system. The short range wireless communication sub-system 924 may include an infrared port, a Bluetooth interface, an IEEE 802.11 compliant wireless interface, or any other short range wireless communication sub-system, which may enable the client node 802 to communicate wirelessly with other nearby client nodes and access nodes. The short-range wireless communication Sub-system 924 may also include suitable RF Transceiver, Antenna and Front End subsystems.

The input/output interface ("Bus") 918 may further connect the DSP 902 to the alert 926 that, when triggered, causes the client node 802 to provide a notice to the user, for example, by ringing, playing a melody, or vibrating. The alert 926 may serve as a mechanism for alerting the user to any of various events such as an incoming call, a new text message, and an appointment reminder by silently vibrating, or by playing a specific pre-assigned melody for a particular caller.

The keypad 928 couples to the DSP 902 via the I/O interface ("Bus") 918 to provide one mechanism for the user to make selections, enter information, and otherwise provide input to the client node 802. The keyboard 928 may be a full or reduced alphanumeric keyboard such as QWERTY, DVORAK, AZERTY and sequential types, or a traditional numeric keypad with alphabet letters associated with a telephone keypad. The input keys may likewise include a trackwheel, track pad, an exit or escape key, a trackball, and other navigational or functional keys, which may be inwardly depressed to provide further input function. Another input mechanism may be the LCD 930, which may include touch screen capability and also display text and/or graphics to the user. The LCD controller 932 couples the DSP 902 to the LCD 930.

The CCD camera 934, if equipped, enables the client node 802 to make digital pictures. The DSP 902 communicates with the CCD camera 934 via the camera controller 936. In another embodiment, a camera operating according to a technology other than Charge Coupled Device cameras may be employed. The GPS sensor 938 is coupled to the DSP 902 to decode global positioning system signals or other navigational signals, thereby enabling the client node 802 to determine its position. The GPS sensor 938 may be coupled to an antenna and front end (not shown) suitable for its band of operation. The GPS sensor 938 may include both the GNSS positioning engine 104 and the pseudolites positioning engine 112. Various other peripherals may also be included to provide additional functions, such as radio and television reception.

In various embodiments, the client node (e.g., 802) comprises a first Radio Access Technology (RAT) transceiver 954 and a second RAT transceiver 958. As shown in FIG. 9, and described in greater detail herein, the RAT transceivers '1' 954 and '2' 958 are in turn coupled to a multi-RAT communications subsystem 950 by an Inter-RAT Supervisory Layer Module 952. In turn, the multi-RAT communications subsystem 950 is operably coupled to the Bus 918. Optionally, the respective radio protocol layers of the first Radio Access Technology (RAT) transceiver 954 and the second RAT transceiver 958 are operably coupled to one another through an Inter-RAT eXchange Function (IRXF) Module 956.

In various embodiments, the network node (e.g. 824) acting as a server comprises a first communication link corresponding to data to/from the first RAT and a second communication link corresponding to data to/from the second RAT.

IX. Exemplary Method Embodiments

Therefore, in one aspect, the present disclosure provides a computer-implemented method of determining a frequency drift of clock of a mobile communication device, the method including: receiving a first positioning signal at a first positioning engine of the mobile communication device controlled by the clock; receiving a second positioning signal at a second positioning engine of the mobile communication device controlled by the clock; determining a first position from the first positioning signal; determining a second position from the second positioning signal; determining a difference between the first position and the second position; and determining the frequency drift from the difference between the first position and the second position. The method may include subsequently using the frequency drift determined to improve the accuracy of M-LMS positioning signals, such as by using the frequency drift determined to subsequently correct for clock drift. The method may include additional, fewer, or alternate actions, including those discussed elsewhere herein.

In another aspect, the present disclosure provides a computer-implemented method of determining a frequency drift of clock of a mobile communication device. The method may include, determining a first position from a first type of positioning signal that uses the clock, such as a Pseudolite positioning signal; determining a second position from a second type of positioning signal that uses the clock, such as a GPS or other GNSS positioning signal; determining a difference between the first position and the second position; determining the frequency drift of the clock from the difference between the first position and the second position, and using the frequency drift of the clock calculated to enhance accuracy of Pseudolite-based positioning and/or navigation when GPS or GNSS signals are unavailable or unreliable. The method may include additional, fewer, or alternate actions, including those discussed elsewhere herein.

In another aspect, a computer-implemented method of indoor navigation may be provided. The method include, for a system that utilizes one clock for both GNSS and M-LMS positioning, (1) turning on a M-LMS receiver and obtaining a M-LMS position fix when a GNSS (or GPS) position fix is obtained with a reported low DOP (or with a DOP below a predetermined threshold indicating a good fix); and (2) calculating the error in distance between the GNSS position fix and the M-LMS position fix. If the M-LMS position error is greater than a predetermined error threshold, e.g., 10 meters, the method may include (3) calculating the time offset, i.e., drift, necessary to reduce the M-LMS position error to approximately zero or at least less than the predetermined error threshold. The method may include (4) updating polynomial coefficients to correct for the difference in clock drift at the measured time of clock operation. The method may include (5) repeating the foregoing when outdoors to build a history log of GNSS/M-LMS clock drift corrections and offsets. Subsequently, the method may include (6) utilizing the clock drift history developed during open sky conditions to determine offset values when in an indoor environment (or when GNSS signals are otherwise unreliable), and applying the offset values to correct clock drift for M-LMS signals and thus improve M-LMS based positioning accuracy. The method may include additional, fewer, or alternate actions, including those discussed elsewhere herein.

X. Exemplary Apparatus Embodiments

In one aspect, the present disclosure provides an apparatus for determining a frequency drift of a clock of a mobile communication device, the apparatus including: a first positioning engine of the mobile communication device configured to determine a first position of the mobile communication device using a terrestrial-based positioning signal received at the mobile communication device; a second positioning engine of the mobile communication device configured to determine a second position of the mobile communication device using a Global Navigation Satellite System (GNSS) positioning signal received at the mobile communication device; a clock configured to control the first positioning engine and the second positioning engine; and a processor configured to: determining a difference between the first position and the second position, and determine a frequency drift of the clock from the difference between the first position and the second position. The frequency drift determined may be subsequently used to enhance accuracy of M-LMS based positioning when GNSS signals are unreliable. The apparatus may include additional, fewer, or alternate components.

In yet another aspect, the present disclosure provides non-transitory computer-readable medium having stored thereon a set of instructions that when accessed by a processor enable the processor to perform a method for determining a frequency drift of clock in a mobile communication device, the method including: receiving a first positioning signal at a first positioning engine of the mobile communication device controlled by the clock; receiving a second positioning signal at a second positioning engine of the mobile communication device controlled by the clock; determining a first position from the first positioning signal; determining a second position from the second positioning signal; determining a difference between the first position and the second position; and determining the frequency drift from the difference between the first position and the second position. The instructions may also include applying the frequency drift determined to the clock when new M-LMS signals are being received to improve the positioning accuracy thereof. The instructions may include additional, less, or alternate functionality, including functionality discussed elsewhere herein.

In another aspect, the present disclosure provides an apparatus for determining a frequency drift of a clock of a mobile communication device, the apparatus may including: means for determining a first position of the mobile communication device using a terrestrial-based positioning signal received at the mobile communication device; means for determining a second position of the mobile communication device using a Global Navigation Satellite System (GNSS) positioning signal received at the mobile communication device; a clock configured to control (a) the means for determining the first position and (b) the means for determining the second position; and means for determining a difference between the first position and the second position, means for determining a frequency drift of the clock from the difference between the first position and the second position, and means for applying the frequency drift determined to the clock to improve accuracy of M-LMS positioning when GNSS positioning signals are unreliable. The "means for" functionality mentioned above may be implemented via one or more processors and/or computer instructions stored on non-transitory storage medium. The apparatus may include additional, less, or alternate functionality, including the functionality discussed elsewhere herein.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer-implemented method of determining a frequency drift of a clock of a mobile communication device, comprising:
   receiving a first positioning signal at a first receiver of the mobile communication device controlled by the clock;
   receiving a second positioning signal at a second receiver of the mobile communication device controlled by the clock;
   determining a first position from the first positioning signal, wherein the first position indicates a first geographic position of the mobile communication device;
   determining a second position from the second positioning signal, wherein the second position indicates a second geographic position of the mobile communication device;
   determining a difference between the first position and the second position; and
   determining the frequency drift from the difference between the first position and the second position.

2. The method of claim 1, further comprising using the determined frequency drift to alter a polynomial curve representing frequency drift of the clock over time.

3. The method of claim 2, further comprising determining the position of the mobile communication device using a frequency drift selected from the altered polynomial curve.

4. The method of claim 2, further comprising:
   determining a third position using a third positioning signal received at the first receiver and a frequency drift selected from the altered polynomial curve;
   determining a fourth position using a fourth positioning signal received at the second receiver and the selected frequency drift;
   determining a difference between the third position and the fourth position;
   determining a second frequency drift from the difference between the third position and the fourth position; and
   altering the polynomial curve using the second frequency drift.

5. The method of claim 1, wherein the first positioning signal comprises a terrestrial-based positioning signal, wherein the first receiver comprises a pseudolites receiver, wherein the second positioning signal is a Global Navigation Satellite System (GNSS) positioning signal, and wherein the second receiver comprises a GNSS receiver.

6. The method of claim 1, wherein the clock further comprises a temperature-controlled crystal oscillator.

7. The method of claim 1, further comprising obtaining the first signal and the second signal when an environmental parameter measurement indicates that signals having signal strengths suitable for obtaining the first signal and the second signal are available.

8. An apparatus for determining a frequency drift of a clock of a mobile communication device, comprising:
   a first receiver of the mobile communication device configured to determine a first position of the mobile communication device using a terrestrial-based positioning signal received at the mobile communication device, wherein the first position indicates a first geographic position of the mobile communication device;

a second receiver of the mobile communication device configured to determine a second position of the mobile communication device using a Global Navigation Satellite System (GNSS) positioning signal received at the mobile communication device, wherein the second position indicates a second geographic position of the mobile communication device;

a clock configured to control the first receiver and the second receiver; and a processor configured to:

determine a difference between the first position and the second position, and determine a frequency drift of the clock from the difference between the first position and the second position.

9. The apparatus of claim 8, wherein the processor is further configured to use the determined frequency drift to alter a polynomial curve of frequency drift of the clock over time.

10. The apparatus of claim 9, wherein the processor is further configured to determine a position of the mobile communication device using a frequency drift selected from the altered polynomial curve.

11. The apparatus of claim 9, wherein the processor is further configured to:

receive a third position calculated using a third positioning signal received at the first receiver and a frequency drift selected from the altered polynomial curve;

receive a fourth position calculated using a fourth positioning signal received at the second receiver and the selected frequency drift;

determine a difference between the third position and the fourth position;

determining a second frequency drift of the clock from the determined difference between the third position and the fourth position; and alter the polynomial curve using the second frequency drift.

12. The apparatus of claim 8, wherein the clock further comprises a temperature-controlled crystal oscillator.

13. The apparatus of claim 8, wherein the processor is further configured to obtain the first signal and the second signal when an environmental parameter measurement indicates that suitable signals for obtaining the first signal and the second signal are available.

14. A non-transitory computer-readable medium having stored thereon a set of instructions that when accessed by a processor enable the processor to perform a method for determining a frequency drift of a clock in a mobile communication device, the method comprising:

receiving a first positioning signal at a first receiver of the mobile communication device controlled by the clock;

receiving a second positioning signal at a second receiver of the mobile communication device controlled by the clock;

determining a first position from the first positioning signal, wherein the first position indicates a first geographic position of the mobile communication device;

determining a second position from the second positioning signal, wherein the second position indicates a second geographic position of the mobile communication device;

determining a difference between the first position and the second position;

determining the frequency drift from the difference between the first position and the second position.

15. The computer-readable medium of claim 14, wherein the method further comprises using the determined frequency drift to alter a polynomial curve representing frequency drift of the clock over time.

16. The computer-readable medium of claim 15, wherein the method further comprises determining the position of the mobile communication device using a frequency drift selected from the altered polynomial curve.

17. The computer-readable medium of claim 15, wherein the method further comprises:

determining a third position using a third positioning signal received at the first receiver and a frequency drift selected from the altered polynomial curve;

determining a fourth position using a fourth positioning signal received at the second receiver and the selected frequency drift;

determining a difference between the third position and the fourth position;

determining a second frequency drift from the difference between the third position and the fourth position; and altering the polynomial curve using the second frequency drift.

18. The computer-readable medium of claim 14, wherein the first positioning signal comprises a terrestrial-based positioning signal, wherein the first receiver comprises a pseudolites receiver, wherein the second positioning signal is a Global Navigation Satellite System (GNSS) positioning signal, and wherein the second receiver comprises a GNSS receiver.

19. The computer-readable medium of claim 14, wherein the clock further comprises a temperature-controlled crystal oscillator.

20. The computer-readable medium of claim 14, further comprising obtaining the first signal and the second signal when a received environmental parameter measurement indicates that signals having suitable strengths for obtaining the first signal and the second signal are available.

* * * * *